US012669803B2

(12) United States Patent
Jia et al.

(10) Patent No.: US 12,669,803 B2
(45) Date of Patent: Jun. 30, 2026

(54) ASSESSMENT AND CONTROL METHOD, SYSTEM AND DEVICE FOR TIME-ENERGY EFFICIENCY OF CNC MACHINE TOOLS

(71) Applicant: Shandong University of Science and Technology, Qingdao (CN)

(72) Inventors: Shun Jia, Qingdao (CN); Yang Yang, Qingdao (CN); Na Zhang, Qingdao (CN); Jingyan Zhang, Qingdao (CN); Shang Wang, Qingdao (CN); Le Ma, Qingdao (CN); Shengshuai Su, Qingdao (CN); Yihao Guan, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 375 days.

(21) Appl. No.: 18/278,152

(22) PCT Filed: Oct. 10, 2022

(86) PCT No.: PCT/CN2022/124240
§ 371 (c)(1),
(2) Date: Aug. 21, 2023

(87) PCT Pub. No.: WO2024/040702
PCT Pub. Date: Feb. 29, 2024

(65) Prior Publication Data
US 2025/0036104 A1 Jan. 30, 2025

(30) Foreign Application Priority Data
Aug. 20, 2022 (CN) .......................... 202211003697.9

(51) Int. Cl.
G05B 19/4155 (2006.01)

(52) U.S. Cl.
CPC .................... *G05B 19/4155* (2013.01); *G05B 2219/33099* (2013.01)

(58) Field of Classification Search
None
See application file for complete search history.

(56) References Cited

U.S. PATENT DOCUMENTS

2021/0247740 A1* 8/2021 Jia ...................... G05B 19/4155
2021/0349437 A1* 11/2021 Liu ...................... G05B 19/406

FOREIGN PATENT DOCUMENTS

CN 103235555 A 8/2013
CN 103235555 B * 3/2015
(Continued)

*Primary Examiner* — David Earl Ogg
(74) *Attorney, Agent, or Firm* — MUNCY, GEISSLER, OLDS & LOWE, P.C.

(57) ABSTRACT

An assessment and control method, system and device for time-energy efficiency of CNC machine tools. The method comprises: comprehensively analyzing the influence of factors of the startup rate and extra startup frequency of a CNC machine tool on the energy efficiency of the CNC machine tool, and constructing a mathematical model of the time-energy efficiency of the CNC machine tool and the startup rate and extra startup frequency of the CNC machine tool. The time-energy efficiency of the CNC machine tool is monitored to realize the overlimit warning function for the time-energy efficiency of the CNC machine tool to finally control the time-energy efficiency of the CNC machine tool within a target range. The present invention analyzes the influence of the downtime loss of the CNC machine tool on the energy efficiency of the CNC machine tool, and can realize overlimit warning for time-energy efficiency of the CNC machine tool.

9 Claims, 2 Drawing Sheets

(56)　　　　　References Cited

FOREIGN PATENT DOCUMENTS

| | | | | |
|---|---|---|---|---|
| CN | 107193259 | A | 9/2017 | |
| CN | 109491323 | A | 3/2019 | |
| CN | 109634238 | A * | 4/2019 | ....... G05B 19/41875 |
| CN | 112255969 | A | 1/2021 | |
| CN | 113010980 | A | 6/2021 | |
| JP | 2007234002 | A | 9/2007 | |

* cited by examiner

ASSESSMENT AND CONTROL METHOD,
SYSTEM AND DEVICE FOR TIME-ENERGY
EFFICIENCY OF CNC MACHINE TOOLS

TECHNICAL FIELD

The present invention belongs to the technical field of energy efficiency data monitoring of CNC machine tools, and discloses an assessment and control method, system and device for time-energy efficiency of CNC machine tools.

BACKGROUND

As a processing device commonly used in manufacturing industry, the CNC machine tool accounts for a large proportion of carbon emission in manufacturing industry. With the continuous transformation of the manufacturing industry towards green and low carbon, in the aspect of the CNC machine tool, an assessment and control method for time-energy efficiency in the processing course is studied, so as to reduce unnecessary energy waste and satisfy the needs of low-carbon manufacturing.

The energy efficiency of the CNC machine tool is affected by the processing rate and quality, and the utilization efficiency of the energy is also affected by the factor of device downtime in the processing course. Through the currently disclosed technical analysis, the analysis of the energy efficiency aspect is mainly the relationship between the processing course and energy efficiency, and an assessment and control method for energy efficiency capable of considering the time factors of startup and downtime of the CNC machine tool is still needed.

Through the above analysis, the problems and defects of the prior art are as follows:

(1) In the prior art, without establishing a relationship model of the startup rate of the CNC machine tool, the extra startup frequency of the CNC machine tool and the time-energy efficiency of the CNC machine tool, overlimit warning for the time-energy efficiency of the CNC machine tool cannot be realized and it is impossible to effectively assist operators to effectively find the reduction of energy efficiency for operation of the CNC machine tool due to the factor of downtime.

(2) In the prior art, because the reason for energy efficiency anomaly caused by downtime loss during processing of the CNC machine tool cannot be found effectively, the working efficiency is influenced, and the failure of the device cannot be found in time, which increases the production cost. Moreover, the assessment method for energy efficiency of the CNC machine tool in the prior art is only used in the aspect of the CNC machine tool, and is not practical to monitor and control the time-energy efficiency of other mechanical devices.

SUMMARY

To overcome the problems in the related art, embodiments of the present invention provide an assessment and control method, system and device for time-energy efficiency of CNC machine tools, and particularly relate to an assessment and control method for time-energy efficiency of CNC machine tools for low-carbon manufacturing in the technical field of energy efficiency assessment and energy efficiency monitoring and improvement of CNC machine tools in manufacturing industry.

The technical solution is as follows: an assessment and control method for time-energy efficiency of CNC machine tools comprises the following steps:

Firstly, in the method of the present invention, establishing a startup rate model of a CNC machine tool through the total planned processing time, downtime and non-operation time of the CNC machine tool in a given processing cycle; further establishing a time-energy efficiency model of the CNC machine tool by constructing an effective energy model of planned processing, target processing effective energy within operation time, and an extra standby energy model; secondly, establishing a relationship model of the startup rate, the extra startup frequency and the time-energy efficiency based on the analysis results of the influence of the startup rate and the extra startup frequency of the CNC machine tool on the energy efficiency of the CNC machine tool; and finally, monitoring the time-energy efficiency of the CNC machine tool in real time to realize the overlimit warning function for the time-energy efficiency of the CNC machine tool to finally control the time-energy efficiency of the CNC machine tool within a target range.

The method comprises the following specific steps:

step 1, collecting the output power of a main power supply of the CNC machine tool in real time through a power sensor, and processing and analyzing the rule of the state change of a power curve to obtain the total planned processing time $T_{planed}$, downtime $T_{downtime}$ and extra startup frequency N of the CNC machine tool within a given processing cycle;

step 2, through the downtime $T_{downtime}$, the extra startup frequency N and single startup time $T_{startup}$ of the CNC machine tool within the given processing cycle, obtaining the non-operation time $T_{unavailable}$ of the CNC machine tool, with a calculation model thereof as follows:

$$T_{unavailable} = T_{downtime} + N \times T_{startup}$$

wherein $T_{unavailable}$ represents the non-operation time of the CNC machine tool, $T_{downtime}$ represents the downtime, N represents the extra startup frequency, and $T_{startup}$ represents the single startup time of the CNC machine tool;

step 3, through the total planned processing time $T_{planed}$ and the non-operation time $T_{planed}$ of the CNC machine tool within the given processing cycle, calculating the startup rate $\eta_{availablity}$ of the CNC machine tool, with a calculation model thereof as follows:

$$\eta_{availability} = \frac{T_{planed} - T_{unavailable}}{T_{planed}}$$

wherein $\eta_{availablity}$ represents the startup rate of the CNC machine tool; $T_{planed}$ represents the total planned processing time; and $T_{planed}$ represents the non-operation time of the CNC machine tool within the processing cycle;

step 4, through the obtained total planned processing time $T_{planed}$ of the CNC machine tool within the given processing cycle and in combination with the ideal processing time $T_{ideal\_CT}$ of a single part and the ideal processing energy $E_{ideal}$ of the single part, calculating the total planned processing effective energy $E_{planed}$ of the CNC machine tool without downtime, with a calculation model thereof as follows:

$$E_{planed} = \frac{T_{planed}}{T_{ideal\_CT}} \times E_{ideal}$$

wherein $E_{planed}$ represents the total planned processing effective energy; $T_{planed}$ represents the total planned processing time; $T_{ideal\_CT}$ represents the ideal processing time of a single part; $E_{ideal}$ represents the ideal processing energy of a single part;

step 5, through the obtained non-operation time $T_{unavailable}$ of the CNC machine tool within the given processing cycle and in combination with the ideal processing time $T_{ideal\_CT}$ of a single part and the ideal processing energy $E_{ideal}$ of the single part, calculating the downtime loss effective energy $E_{downtime}$ when the CNC machine tool has downtime, with a calculation model thereof as follows:

$$E_{downtime} = \frac{T_{unavailable}}{T_{ideal\_CT}} \times E_{ideal}$$

wherein $E_{downtime}$ represents the downtime loss effective energy; $T_{unavailable}$ represents the non-operation time of the CNC machine tool; $T_{ideal\_CT}$ represents the ideal processing time of a single part; and $E_{ideal}$ represents the ideal processing energy of a single part;

step 6, through the obtained total planned processing effective energy $E_{planed}$ and downtime loss effective energy $E_{downtime}$ of the CNC machine tool within the given processing cycle, calculating the target processing effective energy $E_{available}$ within the operation time of the CNC machine tool, with a calculation model thereof as follows:

$$E_{available} = E_{planed} - E_{downtime}$$

wherein $E_{available}$ represents the target processing effective energy within the operation time; $E_{planed}$ represents the total planned processing effective energy; and $E_{downtime}$ represents the downtime loss effective energy;

step 7, calculating the extra startup energy through the extra startup frequency N of the CNC machine tool within the given processing cycle and energy $E_{startup}$ required for single startup of the CNC machine tool, with a calculation model thereof as follows:

$$E_{startup\_ex} = N \times E_{startup}$$

wherein $E_{startup\_ex}$ represents the extra startup energy of the CNC machine tool, N represents extra startup frequency, and $E_{startup}$ represents the energy required by single startup of the CNC machine tool;

step 8, through the target processing effective energy $E_{available}$, downtime loss effective energy $E_{downtime}$ and extra startup energy $E_{startup\_ex}$ within the operation time of the CNC machine tool within the given processing cycle, calculating the time-energy efficiency $\eta_{availablity\_e}$ of the CNC machine tool, with a calculation model thereof as follows:

$$\eta_{availablity\_e} = \frac{E_{available}}{E_{available} + E_{downtime} + E_{startup\_ex}}$$

wherein $\eta_{availablity\_e}$ represents the time-energy efficiency of the CNC machine tool; $E_{available}$ represents the target processing effective energy within the operation time; $E_{downtime}$ represents the downtime loss effective energy; and $E_{startup\_ex}$ represents the extra startup energy of the CNC machine tool;

step 9, establishing a relationship model of the time-energy efficiency of the CNC machine tool, the startup rate of the CNC machine tool and the extra startup frequency according to the obtained time-energy efficiency model and the startup rate model of the CNC machine tool, with an expression of the relationship model as follows:

$$\eta_{availablity\_e} = \frac{\eta_{availablity} \times T_{planed} \times E_{ideal}}{T_{planed} \times E_{ideal} + N \times E_{startup} \times T_{ideal\_CT}}$$

wherein $\eta_{availablity\_e}$ represents the time-energy efficiency of the CNC machine tool; $\eta_{availablity}$ represents the startup rate of the CNC machine tool; $T_{planed}$ represents the total planned processing time of the CNC machine tool; $E_{ideal}$ represents the ideal processing energy of a single part; N represents the extra startup frequency of the CNC machine tool; $E_{startup}$ represents the energy required for single startup of the CNC machine tool; and $T_{ideal\text{-}CT}$ represents the ideal processing time of a single part;

step 10, comparing the calculated time-energy efficiency $\eta_{availablity\_e}$ of the CNC machine tool within a processing cycle with a preset time-energy efficiency warning lower limit value $$\eta_{availability\_e}^{L}$$

of the CNC machine tool; if the relational expression $$\eta_{availability\_e} \geq \eta_{availability\_e}^{L}$$

is satisfied, this indicates that the time-energy efficiency of the CNC machine tool is normal; if the relational expression $$\eta_{availablity\_e} < \eta_{availablity\_e}^{L}$$

is satisfied, a waring is issued to indicate that the time-energy efficiency of the CNC machine tool is abnormal; and meanwhile, the time-energy efficiency of the CNC machine tool within the cycle, the startup rate, the downtime, the extra startup frequency of the CNC machine tool, and other information are displayed on a display screen;

step 11, taking corresponding measures by an operator for control according to a warning prompt in step 10 based on the change of downtime factors of the CNC machine tool, to increase the startup rate of the CNC machine tool and reduce the extra startup frequency, so that the time-energy efficiency of the CNC machine tool is kept within the target range.

In one embodiment, in step 1, a power sensor is installed at an air switch of a main power supply of the CNC machine tool to collect the power of the main power supply of the CNC machine tool in real time and conduct A/D conversion; an obtained input power digital signal is transmitted to an information processing terminal and filtered; the operating state of the CNC machine tool is identified online through input power information, and the downtime and extra startup frequency of the CNC machine tool are counted; the CNC machine tool is set to be in a startup state at the beginning of the processing cycle; then the total planned processing time of the CNC machine tool within the processing cycle is denoted as $T_{planed}$; the downtime of the CNC machine tool within the processing cycle is denoted as $T_{downtime}$; and the extra startup frequency of the CNC machine tool within the processing cycle is denoted as N.

In one embodiment, in step 2, for the single startup time $T_{startup}$ of the CNC machine tool, the single startup time $T_{startup}$ of the CNC machine tool is calculated by a mean value method through repeated measurement and recording of the time required for single startup of the CNC machine tool.

In one embodiment, in step 4 and step 5, for the ideal processing time $T_{ideal\_CT}$ of a single part and the ideal processing energy $E_{ideal}$ of a single part, through the power sensor installed at the air switch of the CNC machine tool, the time and energy required by the CNC machine tool to process a single part under the condition of ideal processing parameters are obtained through multiple measurement; and the ideal processing time $T_{ideal\_CT}$ of a single part and the ideal processing energy $E_{ideal}$ of a single part are obtained by the mean value method.

In one embodiment, in step 7, for the energy $E_{startup}$ required for single startup of the CNC machine tool, the power sensor installed at the air switch collects the energy data in the startup process of the CNC machine tool, and the energy $E_{startup}$ required for single startup is obtained by a mean value method through multiple measurement.

Another purpose of the present invention is to provide an assessment and control device for time-energy efficiency of CNC machine tools, comprising: a CNC machine tool, a power sensor, a computer and a display screen.

The power sensor is used to measure the power of the CNC machine tool and obtain the energy data of the CNC machine tool.

The computer is used to process a power signal and store the collected data information of total planned processing time, downtime, extra startup frequency and energy required for single startup of the CNC machine tool.

The display screen is connected with the computer, and is used to display the information of time-energy efficiency, a startup rate, total planned processing time, downtime, extra startup frequency and energy required for single startup of the CNC machine tool.

Another purpose of the present invention is to provide an assessment and control system for time-energy efficiency of CNC machine tools, comprising:

a non-operation time acquisition module of the CNC machine tool, used for acquiring the output power of a main power supply of the CNC machine tool collected in real time through the power sensor, and processing the rule of the state change of a power curve to obtain the total planned processing time and downtime of the CNC machine tool to obtain the non-operation time of the CNC machine tool within a processing cycle;

a target processing effective energy acquisition module within operation time, used for calculating the startup rate of the CNC machine tool through the total planned processing time of the CNC machine tool and the non-operation time of the CNC machine tool, and respectively calculating the total planned processing effective energy without downtime and the downtime loss effective energy with downtime through the total planned processing time, the non-operation time of the CNC machine tool and the ideal processing time of a single part in combination with the ideal processing time of a single part and the ideal processing energy of a single part, to obtain the target processing effective energy within operation time;

a relationship model acquisition module, used for calculating the time-energy efficiency of the CNC machine tool through the target processing effective energy within operation time, the downtime loss effective energy and the extra startup energy, establishing a relationship model of the time-energy efficiency of the CNC machine tool, the startup rate of the CNC machine tool and the extra startup frequency based on the established startup rate of the CNC machine tool and the time-energy efficiency, and monitoring the time-energy efficiency of the CNC machine tool in real time through the relationship model of the time-energy efficiency of the CNC machine tool, the startup rate of the CNC machine tool and the extra startup frequency and conducting overlimit warning for the energy efficiency.

Another purpose of the present invention is to provide a computer device, comprising a memory and a processor. The memory stores computer programs, and when the computer programs are executed by the processor, the processor executes the assessment and control method for time-energy efficiency of CNC machine tools.

In combination with all the above technical solutions, compared with the prior art, the present invention has the following beneficial effects:

Firstly, for the technical problems in the above prior art and the difficulty in solving the problems, in close combination with the technical solution to be protected by the present invention and results and data in the development process, detailed and profound analysis is made about how to solve the technical problems by the technical solution of the present invention, as well as some creative technical effects brought after the problems are solved. The detailed description is as follows:

First, the method of the present invention comprises: analyzing the rule of the state change of a power curve of the CNC machine tool to obtain the total planned processing time, downtime and non-operation time of the CNC machine tool in a given processing cycle for establishing a startup rate model of a processing course of the CNC machine tool; establishing a time-energy efficiency model of the CNC machine tool by constructing an effective energy model of planned processing, an effective energy model of downtime loss, target processing effective energy within operation time, and an extra standby energy model, based on energy characteristics; secondly, comprehensively considering the influence of the startup rate of the CNC machine tool and the extra startup frequency on the time-energy efficiency of the CNC machine tool, and establishing a relationship model of the startup rate, the extra startup frequency and the time-energy efficiency of the CNC machine tool; and finally, monitoring the time-energy efficiency of the CNC machine tool in real time to realize the overlimit warning for the time-energy efficiency of the CNC machine tool, so that operators control the time-energy efficiency of the CNC machine tool in time and targetedly within a target range. The method of the present invention is a practical and feasible assessment and control method for time-energy efficiency of CNC machine tools.

Secondly, considering the technical solution as a whole or from the perspective of products, the technical effects and advantages of the technical solution to be protected by the present invention are specifically described as follows:

In the assessment method for time-energy efficiency of the processing curse of CNC machine tools provided by the present invention, compared with a preset control lower limit value for time-energy efficiency of CNC machine tools, the lower limit warning for time-energy efficiency of the processing curse of CNC machine tools is realized, thereby stably controlling the time-energy efficiency within a target range.

The method of the present invention comprehensively considers the influence of factors of the startup rate and extra startup frequency of a CNC machine tool on the energy efficiency of the CNC machine tool, and constructs a mathematical model of the time-energy efficiency of the CNC machine tool and the startup rate and extra startup frequency of the CNC machine tool. The time-energy efficiency of the CNC machine tool is monitored in real time to realize the overlimit warning function for the time-energy efficiency of the CNC machine tool to finally control the time-energy efficiency of the CNC machine tool within a target range. The method of the present invention analyzes the influence of the downtime loss of the CNC machine tool on the energy efficiency of the CNC machine tool, and can realize the overlimit warning for the time-energy efficiency of the CNC machine tool. Thus, during processing, corresponding measures can be quickly taken targetedly. The method is a low-carbon and practical assessment and control method for the energy efficiency of the CNC machine tool.

Thirdly, as the creative auxiliary evidence of the claims of the present invention, the technical solution of the present invention also provides a new index for the assessment of the energy efficiency of the device and fills in the blank of the industrial technology in China and abroad.

The method of the present invention is based on the time characteristics and the energy characteristics of the processing course of the CNC machine tool, and considers that the startup rate and the extra startup frequency caused by frequent downtime of the CNC machine tool affect the production efficiency of the CNC machine tool and also seriously affect the energy utilization rate of the CNC machine tool. Based on this, the time-energy efficiency model is constructed, which provides a new index for the assessment of the energy efficiency of the processing course of the CNC machine tool.

The method of the present invention monitors and analyzes the time-energy efficiency of the CNC machine tool in real time to realize the overlimit warning for the time-energy efficiency of the CNC machine tool, so that operators of the CNC machine tool can control the time-energy efficiency of the CNC machine tool targetedly within a target range, thereby solving the problem that it is currently difficult to effectively find the reason of energy efficiency anomaly caused by downtime loss during processing of the CNC machine tool in the industry in China and abroad. At the same time, the method of the present invention is not only used for the CNC machine tool, but also can be popularized to monitoring and control for the time-energy efficiency of other mechanical equipment, thereby providing an effective new method and technical support for the realization of energy saving and emission reduction in the manufacturing industry.

DESCRIPTION OF DRAWINGS

The drawings here are incorporated into and constitute portion of the description, are used to illustrate embodiments conforming to the present disclosure, and interpret principles of the present disclosure together with the description.

In the figures: 1 CNC machine tool; 2 power sensor; 3 computer; 4 display screen; 5 non-operation time acquisition module of CNC machine tool; 6 target processing effective energy acquisition module within operation time; 7 relationship model acquisition module.

DETAILED DESCRIPTION

To make the above-mentioned purpose, features and advantages of the present invention more clear and understandable, specific embodiments of the present invention will be described below in detail in combination with the drawings. In the following description, many specific details are elaborated to thoroughly understand the present invention. However, the present invention can be implemented in other modes different from those described herein. Those skilled in the art can make similar improvement without departing from the connotation of the present invention. Therefore, the present invention is not limited by specific embodiments disclosed below.

I EXPLANATION OF EMBODIMENTS

An assessment and control method for time-energy efficiency of CNC machine tools for low carbon manufacturing provided by embodiments of the present invention comprises: firstly, establishing a startup rate model of a CNC machine tool through the total planned processing time, downtime and non-operation time of the CNC machine tool in a given processing cycle by the method of the present invention; further establishing a time-energy efficiency model of the CNC machine tool by constructing an effective energy model of planned processing, target processing effective energy within operation time, and an extra standby energy model; secondly, establishing a relationship model of the startup rate, the extra startup frequency and the time-energy efficiency based on the analysis results of the influence of the startup rate and the extra startup frequency of the CNC machine tool on the energy efficiency of the CNC machine tool, i.e., comprehensively analyzing the influence of the startup rate and the extra startup frequency of the CNC machine tool on the energy efficiency of the CNC machine tool; and finally, monitoring the time-energy efficiency of the CNC machine tool in real time to realize the overlimit warning function for the time-energy efficiency of the CNC machine tool to finally control the time-energy efficiency of the CNC machine tool within a target range.

Embodiment 1

Figure 1:
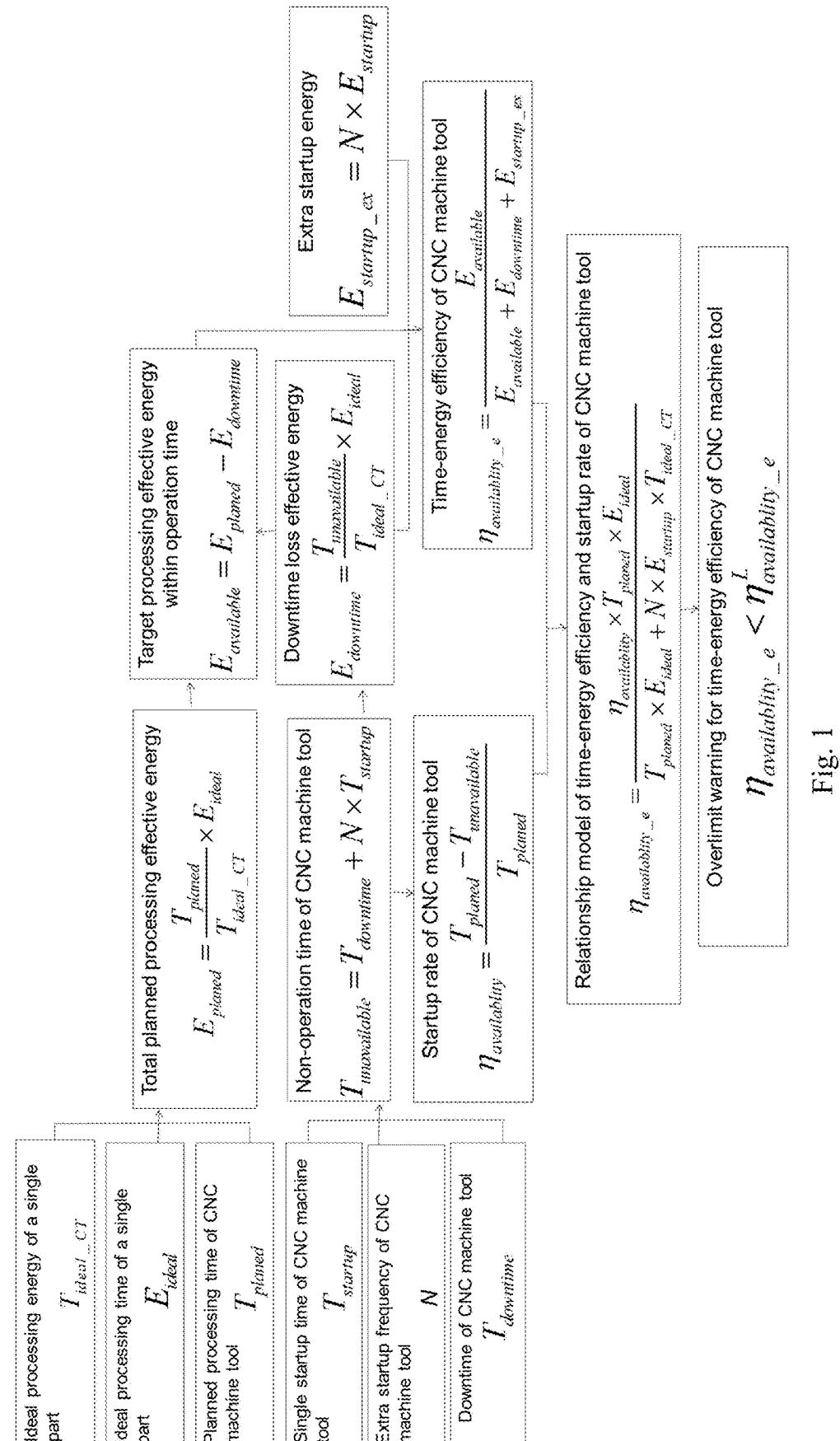
FIG. 1 is a schematic diagram of an assessment and control method for time-energy efficiency of CNC machine tools for low carbon manufacturing provided by embodiments of the present invention.

As shown in FIG. 1, the assessment and control method for time-energy efficiency of CNC machine tools for low carbon manufacturing provided by embodiments of the present invention comprises the following steps:

Step 1, a power sensor is installed at an air switch of a main power supply of the CNC machine tool to collect the power of the main power supply of the CNC machine tool in real time and conduct A/D conversion; an obtained input power digital signal is transmitted to an information processing terminal and filtered; the operating state of the CNC machine tool is identified online through input power information, and the downtime and extra startup frequency of the CNC machine tool are counted. The CNC machine tool is set to be in a startup state at the beginning of the processing cycle; then the total planned processing time of the CNC machine tool within the processing cycle is denoted as $T_{planed}$; the downtime of the CNC machine tool within the processing cycle is denoted as $T_{downtime}$; and the extra startup frequency of the CNC machine tool within the processing cycle is denoted as N.

Step 2, the non-operation time of the CNC machine tool is composed of the downtime of the CNC machine tool and the time taken for extra startup, and a computational formula is as follows:

$$T_{unavailable} = T_{downtime} + N \times T_{startup}$$

wherein $T_{unavailable}$ represents the non-operation time of the CNC machine tool, $T_{downtime}$ represents the downtime, N represents the extra startup frequency, and $T_{startup}$ represents the single startup time of the CNC machine tool.

Step 3, the startup rate of the CNC machine tool is calculated according to the obtained non-operation time of the CNC machine tool and in combination with the total planned processing time, and a computational formula is as follows:

$$\eta_{availablity} = \frac{T_{planed} - T_{unavailable}}{T_{planed}}$$

wherein $\eta_{availablity}$ represents the startup rate of the CNC machine tool; $T_{planed}$ represents the total planned processing time; and $T_{unavailable}$ represents the non-operation time of the CNC machine tool within the processing cycle.

Step 4, when there is no downtime in the processing cycle, the total planned processing effective energy of the CNC machine tool is determined by the total planned processing time, the ideal processing time of a single part and the ideal processing energy of a single part, and a computational formula is as follows:

$$E_{planed} = \frac{T_{planed}}{T_{ideal\_CT}} \times E_{ideal}$$

wherein $E_{planed}$ represents the total planned processing effective energy; $T_{planed}$ represents the total planned processing time; $T_{ideal\_CT}$ represents the ideal processing time of a single part; $E_{ideal}$ represents the ideal processing energy of a single part.

Step 5, when there is downtime in the processing cycle, according to the ideal processing time of a single part, the ideal processing energy of a single part and the calculated non-operation time of the CNC machine tool, a computational formula of the downtime loss effective energy caused by downtime is as follows:

$$E_{downtime} = \frac{T_{unavailable}}{T_{ideal\_CT}} \times E_{ideal}$$

wherein $E_{downtime}$ represents the downtime loss effective energy; $T_{unavailable}$ represents the non-operation time of the CNC machine tool in the processing cycle; $T_{ideal\_CT}$ represents the ideal processing time of a single part; and $E_{ideal}$ represents the ideal processing energy of a single part.

Step 6, based on the obtained total planned processing effective energy and the downtime loss effective energy, the target processing effective energy within operation time is calculated, and a computational formula is as follows:

$$E_{available} = E_{planed} - E_{downtime}$$

wherein $E_{available}$ represents the target processing effective energy within the operation time; $E_{planed}$ represents the total planned processing effective energy; and $E_{downtime}$ represents the downtime loss effective energy.

Step 7, in the processing cycle, extra energy, i.e., extra startup energy, is caused by multiple startup of the CNC machine tool, and a computational formula is shown as follows:

$$E_{startup\_ex} = N \times E_{startup}$$

wherein $E_{startup\_ex}$ represents the extra startup energy of the CNC machine tool, N represents extra startup frequency, and $E_{startup}$ represents the energy required by single startup of the CNC machine tool;

Step 8, according to the calculated total planned processing effective energy of the CNC machine tool, the target processing effective energy within operation time, and extra startup energy, the time-energy efficiency of the CNC machine tool is calculated, and a computational formula is as follows:

$$\eta_{availablity\_e} = \frac{E_{available}}{E_{available} + E_{downtime} + E_{startup\_ex}}$$

wherein $\eta_{availablity\_e}$ represents the time-energy efficiency of the CNC machine tool; $E_{available}$ represents the target processing effective energy within the operation time; $E_{downtime}$ represents the downtime loss effective energy; and $E_{startup\_ex}$ represents the extra startup energy of the CNC machine tool.

Step 9, a relationship model of the time-energy efficiency of the CNC machine tool, the startup rate of the CNC machine tool and the extra startup frequency is calculated through derivation according to the obtained startup rate calculation model of the CNC machine tool and the time-energy efficiency calculation model of the CNC machine tool, with an expression of the relationship model as follows:

$$\eta_{availablity\_e} = \frac{\eta_{availability} \times T_{planed} \times E_{ideal}}{T_{planed} \times E_{ideal} + N \times E_{startup} \times T_{ideal\_CT}}$$

wherein $\eta_{availablity\_e}$ represents the time-energy efficiency of the CNC machine tool; $\eta_{availablity}$ represents the startup rate of the CNC machine tool; $T_{planed}$ represents the total planned processing time of the CNC machine tool; $E_{ideal}$ represents the ideal processing energy of a single part; $N$ represents the extra startup frequency of the CNC machine tool; $E_{startup}$ represents the energy required for single startup of the CNC machine tool; and $T_{ideal-CT}$ represents the ideal processing time of a single part.

Step 10, the calculated time-energy efficiency $\eta_{availablity\_e}$ of the CNC machine tool within a processing cycle is compared with a preset time-energy efficiency warning lower limit value $$\eta^L_{availablity\_e}$$

of the CNC machine tool; if the relational expression $$\eta_{availablity\_e} \geq \eta^L_{availablity\_e}$$

is satisfied, this indicates that the time-energy efficiency of the CNC machine tool is normal; if the relational expression $$\eta_{availablity\_e} < \eta^L_{availablity\_e}$$

is satisfied, a waring is issued to indicate that the time-energy efficiency of the CNC machine tool is abnormal; and meanwhile, the time-energy efficiency of the CNC machine tool within the cycle, the startup rate, the downtime, the extra startup frequency of the CNC machine tool, and other information are displayed on a display screen.

Step 11, an operator takes corresponding measures for control according to a warning prompt in step 10 based on the change of downtime factors of the CNC machine tool, to increase the startup rate of the CNC machine tool and reduce the extra startup frequency, so that the time-energy efficiency of the CNC machine tool is kept within the target range.

Embodiment 2

Based on the assessment and control method for time-energy efficiency of CNC machine tools for low carbon manufacturing provided by embodiment 1 of the present invention, as a preferred embodiment of the present invention, further, in step 4 and step 5, for the ideal processing time $T_{ideal\_CT}$ of a single part and the ideal processing energy $E_{ideal}$ of a single part, through the power sensor installed at the air switch of the CNC machine tool, the time and energy required by the CNC machine tool to process a single part under the condition of ideal processing parameters are obtained through multiple measurement; and the ideal processing time of a single part and the ideal processing energy of a single part are obtained by the mean value method.

Embodiment 3

Based on the assessment and control method for time-energy efficiency of CNC machine tools for low carbon manufacturing provided by embodiment 1 of the present invention, as a preferred embodiment of the present invention, further, in step 7, for the energy $E_{startup}$ required for single startup of the CNC machine tool, the power sensor installed at the air switch collects the energy data in the startup process of the CNC machine tool, and the energy required for single startup is obtained by a mean value method through multiple measurement.

Embodiment 4

Figures 2, 3:
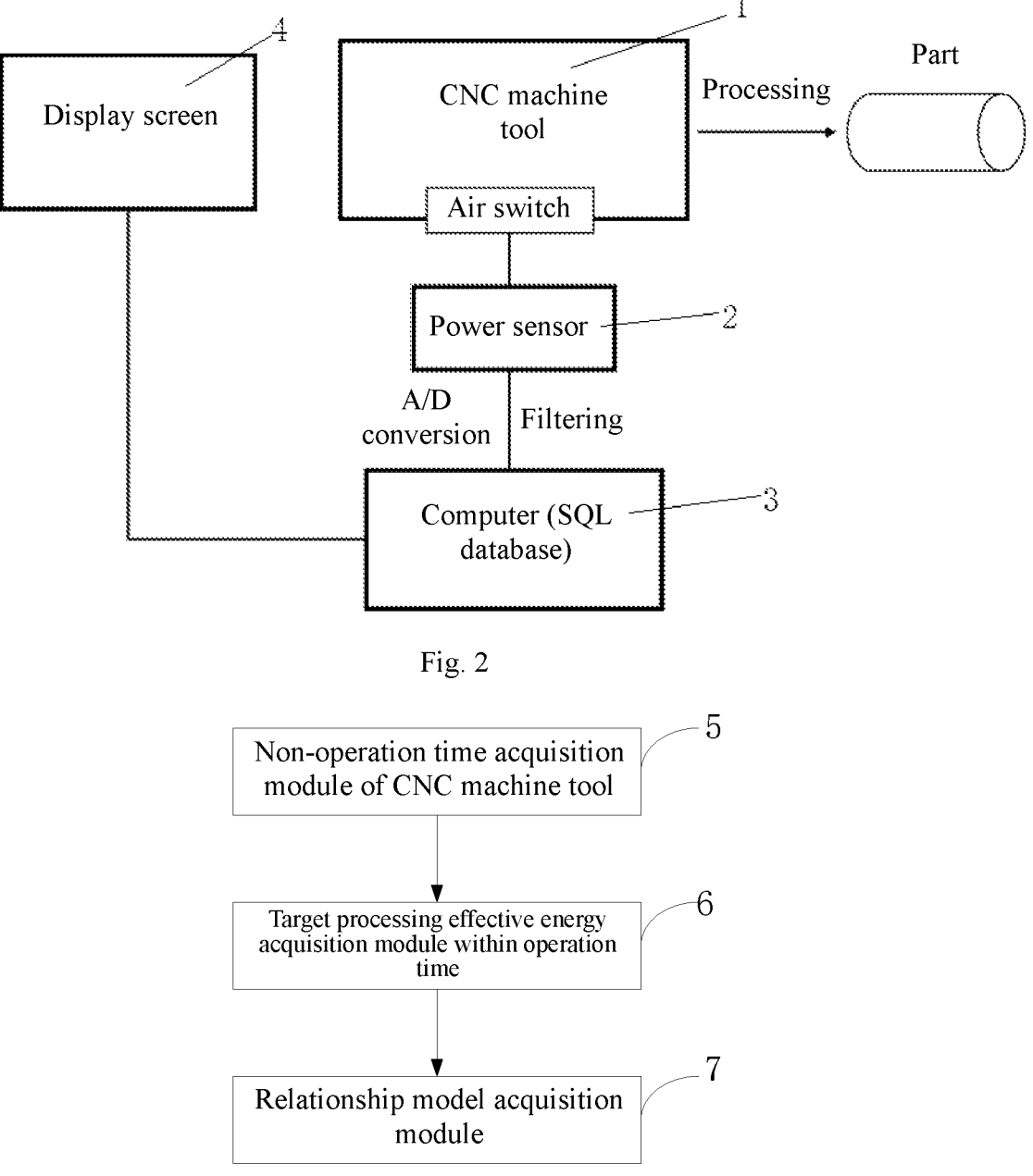
FIG. 2 is a schematic diagram of an assessment and control device for time-energy efficiency of CNC machine tools for low carbon manufacturing provided by embodiments of the present invention.
FIG. 3 is a schematic diagram of an assessment and control system for time-energy efficiency of CNC machine tools for low carbon manufacturing provided by embodiments of the present invention.

As shown in FIG. 2, an assessment and control device for time-energy efficiency of CNC machine tools for low carbon manufacturing provided by embodiments of the present invention comprises: a CNC machine tool 1, a power sensor 2, a computer 3 with Sql database and a display screen 4.

The power sensor 2 is used to measure the power of the CNC machine tool 1 and obtain the energy data of the CNC machine tool.

The computer 3 with Sql database is used to process a power signal and store the collected data information of total planned processing time, downtime, extra startup frequency and energy required for single startup of the CNC machine tool.

The display screen 4 is connected with the computer 3, and is used to display the information of time-energy efficiency, a startup rate, total planned processing time, downtime, extra startup frequency and energy required for single startup of the CNC machine tool.

Embodiment 5

As shown in FIG. 3, the assessment and control system for time-energy efficiency of CNC machine tools for low carbon manufacturing provided by embodiments of the present invention comprises:

a non-operation time acquisition module 5 of the CNC machine tool, used for acquiring the output power of a main power supply of the CNC machine tool collected in real time through the power sensor, and processing the rule of the state change of a power curve to obtain the total planned processing time and downtime of the CNC machine tool to obtain the non-operation time of the CNC machine tool within a processing cycle;

a target processing effective energy acquisition module 6 within operation time, used for calculating the startup rate of the CNC machine tool through the total planned processing time of the CNC machine tool and the non-operation time of the CNC machine tool, and respectively calculating the total planned processing effective energy without downtime and the downtime loss effective energy with downtime through the total planned processing time, the non-operation time of the CNC machine tool and the ideal processing time of a single part in combination with the ideal processing time of a single part and the ideal processing energy of a single part, to obtain the target processing effective energy within operation time;

a relationship model acquisition module 7, used for calculating the time-energy efficiency of the CNC machine tool through the target processing effective energy within operation time, the downtime loss effective energy and the extra startup energy, establishing a relationship model of the time-energy efficiency of the CNC machine tool, the startup rate of the CNC machine tool and the extra startup frequency based on the established startup rate of the CNC machine tool and the time-energy efficiency, and monitoring the time-energy efficiency of the CNC machine tool in real time through the relationship model of the time-energy efficiency of the CNC machine tool, the startup rate of the CNC machine tool and the extra startup frequency and conducting overlimit warning.

In a preferred embodiment of the present invention, the non-operation time acquisition module 5 of the CNC machine tool comprises:

An operation state identification module of the CNC machine tool, used for installing a power sensor at an air switch of a main power supply of the CNC machine tool to collect the power of the main power supply of the CNC machine tool in real time and conduct A/D conversion, transmitting an obtained input power digital signal to an information processing terminal and filtering, identifying the operation state of the CNC machine tool online through input power information, and counting the downtime and extra startup frequency of the CNC machine tool, wherein the CNC machine tool is set to be in a startup state at the beginning of the processing cycle; then the total planned processing time of the CNC machine tool within the processing cycle is denoted as $T_{planed}$; the downtime of the CNC machine tool within the processing cycle is denoted as $T_{downtime}$; and the extra startup frequency of the CNC machine tool within the processing cycle is denoted as N.

a non-operation time calculation module of the CNC machine tool, used for calculating the non-operation time of the CNC machine tool through the downtime of the CNC machine tool and the time taken for extra startup.

In a preferred embodiment of the present invention, the target processing effective energy acquisition module 6 within operation time comprises:

a startup rate calculation module of the CNC machine tool, used for calculating and acquiring the startup rate of the CNC machine tool;

a calculation module of total planned processing effective energy, used for calculating and obtaining the total planned processing effective energy;

a calculation module of downtime loss effective energy, used for calculating and obtaining the downtime loss effective energy;

a target processing effective energy calculation module within operation time, used for calculating and obtaining the target processing effective energy within operation time.

In one embodiment, the relationship model acquisition module 7 comprises:

a time-energy efficiency calculation module of the CNC machine tool, used for calculating and obtaining the time-energy efficiency of the CNC machine tool according to the calculated total planned processing effective energy of the CNC machine tool, the target processing effective energy within operation time, and extra startup energy;

a relationship model building module of the time-energy efficiency of the CNC machine tool, the startup rate of the CNC machine tool and the extra startup frequency, used for establishing a relationship model of the time-energy efficiency of the CNC machine tool, the startup rate of the CNC machine tool and the extra startup frequency according to the obtained startup rate calculation model of the CNC machine tool and the time-energy efficiency of the CNC machine tool;

a warning prompt module used for comparing the calculated time-energy efficiency $\eta_{availablity\_e}$ of the CNC machine tool within a processing cycle with a preset time-energy efficiency warning lower limit value $$\eta_{availablity\_e}^{L}$$

of the CNC machine tool; if the relational expression $$\eta_{availablity\_e} \geq \eta_{availablity\_e}^{L}$$

is satisfied, this indicates that the time-energy efficiency of the CNC machine tool is normal; if the relational expression $$\eta_{availablity\_e} < \eta_{availablity\_e}^{L}$$

is satisfied, a waring is issued to indicate that the time-energy efficiency of the CNC machine tool is abnormal; and meanwhile, the time-energy efficiency of the CNC machine tool within the cycle, the startup rate, the downtime, the extra startup frequency of the CNC machine tool, and other information are displayed on a display screen.

In the above embodiments, the description of each embodiment has the emphasis. For the part not detailed or recorded in one embodiment, the related description of other embodiments can be referred to.

Since the information interaction and execution process between the above devices/units are based on the same conception as the embodiment of the method of the present invention, the specific functions and technical effects can refer to the method embodiment part, and will not be repeated here.

Those skilled in the art can clearly understand that for the convenience and conciseness of illustration, only the division of the above functional units and modules is illustrated. In practical application, the above function allocation can be completed by different functional units and modules as required, that is, the internal structure of the device is divided into different functional units or modules to complete all or part of the above described functions. Each functional unit and module in the embodiments can be integrated into one processing unit, or each unit can exist separately and physically, or two or more units can be integrated into one unit. The integrated units can be realized in the form of hardware or realized in the form of software functional units. In addition, the specific names of the functional units and modules are only for the convenience of distinguishing each other and are not used to limit the protection scope of the present invention. The specific working processes of the units and the modules in the above system can refer to the corresponding processes in the above method embodiments, and will not be repeated here.

II APPLICATION EMBODIMENT

Application Embodiment 1

The application embodiment of the present invention provides a computer device. The computer device comprises: at least one processor, a memory, and computer programs stored in the memory and run on the at least one processor; and the processor realizes the steps in any of the above method embodiments when executing the computer programs.

Application Embodiment 2

The application embodiment of the present invention further provides a computer readable storage medium. The computer readable storage medium stores computer programs, and when executed by the processor, the computer programs can realize the steps of the above method embodiments.

Application Embodiment 3

The application embodiment of the present invention further provides an information data processing terminal. The information data processing terminal, when realized on an electronic device, provides a user input interface to implement the steps in the above method embodiments. The information data processing terminal is not limited to a mobile phone, a computer and a switch.

Application Embodiment 4

The application embodiment of the present invention further provides a server. The server, when executed on an electronic device, provides a user input interface to implement the steps in the above method embodiments.

Application Embodiment 5

The application embodiment of the present invention provides a computer program product. When the computer program product is run on an electronic device, the electronic device can realize the steps in the above method embodiments during execution.

Application Embodiment 6

The assessment and control method for time-energy efficiency of CNC machine tools for low carbon manufacturing provided by embodiments of the present invention is not only used for the CNC machine tool, but also can be popularized to monitoring and control for the time-energy efficiency of other mechanical equipment, including related intelligent control equipment and robots in the fields of chemical processing, automobile manufacturing, electronic equipment processing and transportation infrastructure construction. When the method is executed on an electronic device, the electronic device can realize the steps in the above method embodiments during execution.

If realized in the form of the software functional unit and sold or used as an independent product, the integrated unit can be stored in a computer readable storage medium. Based on such understanding, all or some flows of the methods in the embodiments of the present invention can be completed by instructing related hardware through the computer programs. The computer programs can be stored in a computer readable storage medium. When executed by a processor, the computer programs can realize the steps in the above method embodiments. The computer programs include computer program codes, and the computer program codes may be in source code form, object code form, executable file or some intermediate forms. The computer readable medium may at least include: any entity or device capable of carrying computer program codes to a photographic device/terminal device, a recording medium, a computer memory, Read-Only Memory (ROM), Random Access Memory (RAM), an electrical carrier signal, a telecommunication signal and a software distribution medium, such as a USB flash disk, a mobile hard disk, a magnetic disc or a CD.

III EVIDENCE OF THE RELEVANT EFFECTS OF EMBODIMENTS

The embodiment of the present invention takes a processing part of a CNC machine tool of model CK6153i as an example, and the used part is a cylindrical part. Through the method of the present invention, the time-energy efficiency of the CNC machine tool in a processing cycle is monitored and subjected to overlimit warning, to realize the assessment and control for the energy efficiency of the CNC machine tool. In the present embodiment, 3600 seconds is taken as one processing cycle for assessment. Specifically:

Step 1. Acquiring the Downtime and Extra Startup Frequency of the CNC Machine Tool A power sensor at an air switch of the CNC machine tool is used to collect the power of the CNC machine tool in real time and conduct A/D conversion; an obtained power digital signal is transmitted to an information processing terminal and filtered; the operating state of the CNC machine tool is identified online through input power information, and the information of the time points for startup and downtime of the CNC machine tool is recorded and the downtime is counted. Taking 10:00-11:00 a.m. on January 8th as an example, the total planned processing time within the processing cycle is $T_{planed}=3600$ s; the startup and downtime record data of CK6153i type CNC machine tool is acquired to obtain the downtime of the CNC machine tool within the process cycle, $T_{downtime}=300$ s; and the extra startup frequency is N=3.

Step 2. Acquiring the Time and Energy Required for Single Startup of the CNC Machine Tool The CK6153i type CNC machine tool is started repeatedly, and the time and energy required for startup are measured; the energy required for startup is obtained through measurement and calculation of the power sensor at the air switch; and the data of the time and energy required for 30 groups of measured startup processes is shown in Table 1.

TABLE 1

| Measurement Frequency | 1 | 2 | 3 | 4 | ... | 29 | 30 |
|---|---|---|---|---|---|---|---|
| Startup time (s) | 15.2 | 15.1 | 14.7 | 15.3 | ... | 15.7 | 16.1 |
| Required Energy (kJ) | 1.32 | 1.33 | 1.35 | 1.33 | ... | 1.38 | 1.30 |

30 groups of required time for startup and required energy value, obtained from measurement, are respectively averaged to obtain required lime for startup, $T_{startup}$=15.4 s and required energy for startup, $E_{startup}$=1.33 kJ.

Step 3. Acquiring the Non-Operation Time of the CNC Machine Tool

The computational formula of the non-operation time of the CNC machine tool is $T_{unavailable}$=$T_{downtime}$+N×$T_{startup}$, wherein $T_{unavailable}$ is the non-operation time of the CNC machine tool, in unit of s; $T_{downtime}$ is downtime, in unit of s; N is the extra startup frequency, and $T_{startup}$ is single startup time of the CNC machine tool, in unit of s. Taking 10:00-11:00 a.m. on January 8th as an example, the required lime for startup is $T_{startup}$=15.4 s; the downtime of the CNC machine tool is measured as $T_{downtime}$=300 s; the extra startup frequency is N=3; and the non-operation time of the CNC machine tool is calculated as $$T_{unavailable} = T_{downtime} + N \times T_{startup} = 300 + 3 \times 15.4 = 346.2\, s.$$

Step 4. Acquiring the Startup Rate of the CNC Machine Tool

The computational formula of the startup rate of the CNC machine tool is $$\eta_{availablity} = \frac{T_{planed} - T_{unavailable}}{T_{planed}},$$

wherein $\eta_{availablity}$ is the startup rate of the CNC machine tool and $T_{unavailable}$ is the non-operation time of the CNC machine tool, in unit of s; and $T_{planed}$ is the total planned processing time of the CNC machine tool, in unit of s. Taking 10:00-11:00 a.m. on January 8th as an example, the total planned processing time of the CK6153i type CNC machine tool is $T_{planed}$=3600 s; the non-operation time is $T_{unavailable}$=346.2 s; and the startup rate of the machine tool is calculated as $$\eta_{availablity} = \frac{T_{planed} - T_{unavailable}}{T_{planed}} = \frac{3600 - 346.2}{3600} = 90.38\%.$$

Step 5. Acquiring Total Planned Processing Effective Energy 5.1 Acquiring Ideal Processing Energy of a Single Part The ideal processing energy of a single part is detected by using the power sensor in the present embodiment. A single part is processed under the condition of given ideal processing parameters of the CNC machine tool, and the energy generated during processing is measured repeatedly. The CK6153i type CNC machine tool is subjected to 30 groups of measurement, and measurement results are shown in Table 2.

TABLE 2

| Measurement Frequency | 1 | 2 | 3 | 4 | ... | 29 | 30 |
|---|---|---|---|---|---|---|---|
| Ideal processing energy (kJ) for part | 154.5 | 150.1 | 152.8 | 152.4 | ... | 153.2 | 154.5 |

30 groups of measured results in Table 2 are averaged to obtain the ideal processing energy of a single part, $E_{ideal}$=152.9 kJ.

5.2 Acquiring Total Planned Processing Effective Energy

The computational formula of the total planned processing effective energy is $$E_{planed} = \frac{T_{planed}}{T_{ideal\_CT}} \times E_{ideal},$$

wherein $E_{planed}$ is the total planned processing effective energy, in unit of kJ; $T_{planed}$ is the total planned processing time, in unit of s; $T_{ideal\_CT}$ is the ideal processing time of a single part, in unit of s; $E_{ideal}$ is the ideal processing energy of a single part, in unit of kJ. Taking 10:00-11:00 a.m. on January 8th as an example, the total planned processing time of the CK6153i type CNC machine tool is $T_{planed}$=3600 s; and according to historical data, the ideal processing time of a single part is obtained as $T_{ideal\_CT}$=105 s, and the ideal processing energy of a single art is obtained as $E_{ideal}$=152.9 kJ. The total planned processing effective energy is $$E_{planed} = \frac{T_{planed}}{T_{ideal\_CT}} \times E_{ideal} = \frac{3600}{105} \times 152.9 = 5242.3\ \text{kJ}.$$

Step 6. Acquiring Target Processing Effective Energy within Operation Time

The target processing effective energy within operation time is obtained by subtracting the total planned processing effective energy and the downtime loss effective energy. The computational formula of the downtime loss effective energy is as follows:

$$E_{downtime} = \frac{T_{unavailable}}{T_{ideal\_CT}} \times E_{ideal},$$

wherein $E_{downtime}$ is the downtime loss effective energy, in unit of kJ; $T_{unavailable}$ is the non-operation time of the CNC machine tool within the processing cycle, in unit of s; $T_{ideal\_CT}$ is the ideal processing time of a single part, in unit of s; $E_{ideal}$ is the ideal processing energy of a single part, in unit of kJ. Taking 10:00-11:00 a.m. on January 8th as an example, the non-operation time of the CK6153i type CNC machine tool is $T_{unavailable}$=346.2 s; the ideal processing time of a single part is $T_{ideal\_CT}$=105 s; the ideal processing energy of a single art is $E_{ideal}$=152.9 kJ; and the downtime loss effective energy is calculated as $$E_{downtime} = \frac{T_{unavailable}}{T_{ideal\_CT}} \times E_{ideal} = \frac{346.2}{105} \times 152.9 = 504.1\ \text{kJ}.$$

The target processing effective energy within operation time is $E_{available}$=$E_{planed}$−$E_{downtime}$=5242.3−504.1=4738.2 kJ.

Step 7. Acquiring the Extra Startup Energy of the CNC Machine Tool

The computational formula of the extra startup energy of the CNC machine tool is $E_{startup\_ex}=N\times E_{startup}$, wherein $E_{startup\_ex}$ is the extra startup energy of the CNC machine tool, in unit of kJ; N is the extra startup frequency; $E_{startup}$ is the energy required for single startup of the CNC machine tool, in unit of kJ. Taking 10:00-11:00 a.m. on January 8th as an example, the extra startup frequency is N=3; and the energy required for single startup is $E_{startup}$=1.33 kJ. The extra startup energy of the CNC machine tool is $E_{startup\_ex}=N\times E_{startup}=3\times1.33=4.0$ kJ.

Step 8. Acquiring the Time-Energy Efficiency of the CNC Machine Tool

The computational formula of the time-energy efficiency is $$\eta_{availablity\_e} = \frac{E_{available}}{E_{available} + E_{downtime} + E_{startup\_ex}},$$

wherein $\eta_{availablity\_e}$ is the time-energy efficiency of the CNC machine tool; $E_{available}$ is the target processing effective energy within operation time, in unit of kJ; $E_{downtime}$ is the downtime loss effective energy, in unit of kJ; $E_{startup\_ex}$ is the extra startup energy of the CNC machine tool, in unit of kJ. Taking 10:00-11:00 a.m. on January 8th as an example, the target processing effective energy of the CK6153i type CNC machine tool within operation time is $E_{available}$=4738.2 kJ, the downtime loss effective energy is $E_{downtime}$=504.1 kJ, and the extra startup energy is $E_{startup\_ex}$=4.0 kJ. The time-energy efficiency is $$\eta_{availablity\_e} =$$
$$\frac{E_{available}}{E_{available} + E_{downtime} + E_{startup\_ex}} = \frac{4738.2}{4738.2 + 504.1 + 4.0} = 90.32\%.$$

Step 9. Acquiring the Relationship Model of the Time-Energy Efficiency and the Startup Rate of the CNC Machine Tool

The relationship model of the time-energy efficiency and the startup rate of the CNC machine tool is obtained through the obtained calculation model of the time-energy efficiency of the CNC machine tool and the startup rate of the CNC machine tool, i.e., $$\eta_{availablity\_e} = \frac{\eta_{availablity} \times T_{planed} \times E_{ideal}}{T_{planed} \times E_{ideal} + N \times E_{startup} \times T_{ideal\_CT}},$$

wherein $\eta_{availablity\_e}$ is the time-energy efficiency of the CNC machine tool. $\eta_{availablity}$ is the startup rate of the CNC machine tool; $T_{planed}$ is the total planned processing time of the CNC machine tool, in unit of s; $E_{ideal}$ is the ideal processing energy of a single part, in unit of kJ; N is the extra startup frequency of the CNC machine tool; $E_{startup}$ is the energy required for single startup of the CNC machine tool, in unit of kJ; $T_{ideal-CT}$ is the ideal processing time of a single part, in unit of s. Taking 10:00-11:00 a.m. on January 8th as an example, the total planned processing time of the CNC machine tool within the processing cycle is 3600 s; the ideal processing energy of a single part of the CNC machine tool is 152.9 kJ; the startup frequency is 3; the energy required for single startup of the CNC machine tool is 1.33 kJ; and the ideal processing time of a single part is 105 s. The relationship model of the time-energy efficiency, the startup rate and the extra startup frequency of the CNC machine tool is $$\eta_{availablity\_e} = \frac{\eta_{availablity} \times 550440}{550440 + N \times 139.65}.$$

Step 10. Monitoring and Overlimit Warning of the Time-Energy Efficiency of the CNC Machine Tool

The calculated time-energy efficiency $\eta_{availablity\_e}$ of the CNC machine tool within the processing cycle is compared with a lower limit value $$\eta^L_{availablity\_e}$$

of the time-energy efficiency of the CNC machine tool to detect whether the time-energy efficiency of the CNC machine tool is within a target range. In the present invention, the lower limit value $$\eta^L_{availablity\_e}$$

of the time-energy efficiency of the CNC machine tool is obtained according to the historical data of the CNC machine tool during processing and in combination with managers. It is assumed that the lower limit value of the time-energy efficiency of the CNC machine tool in the present embodiment is $$\eta^L_{availablity\_e} = 88\%.$$

Taking 10:00-11:00 a.m. on January 8th as an example, it is known from the above that the time-energy efficiency of the CNC machine tool is 90.32%, which satisfies the relational expression $$90.32\% = \eta_{availablity\_e} > \eta^L_{availablity\_e} = 88\%,$$

indicating that the time-energy efficiency of the CNC machine tool is within the target range. If the lower limit value of the time-energy efficiency of the CNC machine tool in the present embodiment is $$\eta^L_{availablity\_e} = 92\%, \text{ then } 90.32\% = \eta_{availablity\_e} < \eta^L_{availablity\_e} = 92\%,$$

i.e., the time-energy efficiency of the CNC machine tool is abnormal. Meanwhile, a warning is issued; and the information of the time-energy efficiency $\eta_{availablity\_e}$ of the CNC machine tool, the startup rate $\eta_{availablity}$ of the CNC machine tool, the downtime $T_{downtime}$ of the CNC machine tool and the extra startup frequency N of the CNC machine tool is displayed on a display screen.

Step 11. Adjusting Related Parameters, and Adjusting and Controlling the Time-Energy Efficiency of the CNC Machine Tool An operator of the CNC machine tool targetedly adjusts the processing parameters of the CK6153i CNC machine tool according to a warning prompt in step 10, and controls the time-energy efficiency of the CNC machine tool to be within the target range.

The method of the present invention can be used for scientific assessment and monitoring for the time-energy efficiency of the CNC machine tool in manufacturing industry to control the time-energy efficiency of the CNC machine tool within the target range to realize energy control of the CNC machine tool during production and processing. The method of the present invention provides effective and practical technology and method support for realizing energy saving and emission reduction in the manufacturing industry.

The above only describes the preferred specific embodiments of the present invention, but the protection scope of the present invention is not limited to this. Any modification, equivalent substitution and improvement made within the spirit and principles of the present invention in the technical scope disclosed by the present invention by any of those skilled in the art familiar with the technical field shall be covered within the protection scope of the present invention.

The invention claimed is:

1. An assessment and control method for time-energy efficiency of computer numerical control (CNC) machine tools, comprising:

establishing a startup rate model of a CNC machine tool through the total planned processing time, downtime and non-operation time of the CNC machine tool in a given processing cycle; establishing a time-energy efficiency model of the CNC machine tool by constructing an effective energy model of planned processing, target processing effective energy within operation time, and an extra standby energy model;

establishing a relationship model of the startup rate, the extra startup frequency and the time-energy efficiency based on the analysis results of the influence of the startup rate and the extra startup frequency of the CNC machine tool on the energy efficiency of the CNC machine tool;

monitoring the time-energy efficiency of the CNC machine tool in real time based on the established relationship model of the startup rate, the extra startup frequency and the time-energy efficiency to conduct overlimit warning for the time-energy efficiency of the CNC machine tool and control the time-energy efficiency of the CNC machine tool within a target range.

2. The assessment and control method for time-energy efficiency of CNC machine tools according to claim 1, the assessment and control method for time-energy efficiency of CNC machine tools specifically comprising the following steps:

step 1, collecting the output power of a main power supply of the CNC machine tool in real time through a power sensor, and processing and analyzing a rule of a state change of a power curve to obtain the total planned processing time $T_{planed}$, downtime $T_{downtime}$ and extra startup frequency N of the CNC machine tool within a given processing cycle;

step 2, through the downtime $T_{downtime}$, the extra startup frequency N and single startup time $T_{startup}$ of the CNC machine tool within the given processing cycle, obtaining the non-operation time $T_{unavailable}$ of the CNC machine tool;

step 3, through the total planned processing time $T_{planed}$ and the non-operation time $T_{planed}$ of the CNC machine tool within the given processing cycle, calculating the startup rate $\eta_{availablity}$ of the CNC machine tool;

step 4, through the obtained total planned processing time $T_{planed}$ of the CNC machine tool within the given processing cycle and in combination with ideal processing time $T_{ideal\_CT}$ of a single part and an ideal processing energy $E_{ideal}$ of the single part, calculating the total planned processing effective energy $E_{planed}$ of the CNC machine tool without downtime;

step 5, through the obtained non-operation time $T_{unavailable}$ of the CNC machine tool within the given processing cycle and in combination with the ideal processing time $T_{ideal\_CT}$ of the single part and the ideal processing energy $E_{ideal}$ of the single part, calculating a downtime loss effective energy $E_{downtime}$ when the CNC machine tool has downtime;

step 6, through the obtained total planned processing effective energy $E_{planed}$ and the downtime loss effective energy $E_{downtime}$ of the CNC machine tool within the given processing cycle, calculating the target processing effective energy $E_{available}$ within the operation time of the CNC machine tool;

step 7, calculating the extra startup energy $E_{startup\_ex}$ through the extra startup frequency N of the CNC machine tool within the given processing cycle and energy $E_{startup}$ required for single startup of the CNC machine tool;

step 8, through the target processing effective energy $E_{available}$, the downtime loss effective energy $E_{downtime}$ and extra startup energy $E_{startup\_ex}$ within the operation time of the CNC machine tool within the given processing cycle, calculating the time-energy efficiency $\eta_{availablity\_e}$ of the CNC machine tool;

step 9, establishing a relationship model of the time-energy efficiency of the CNC machine tool, the startup rate of the CNC machine tool and the extra startup frequency according to the obtained time-energy efficiency model and the startup rate model of the CNC machine tool;

step 10, comparing the calculated time-energy efficiency $\eta_{availablity\_e}$ of the CNC machine tool within the given processing cycle with a preset time-energy efficiency warning lower limit value $$\eta_{availablity\_e}^{L}$$

or the CNC machine tool;

step 11, taking corresponding measures by an operator for control according to a warning prompt in step 10 based on the change of downtime factors of the CNC machine tool, so that the time-energy efficiency of the CNC machine tool is within the target range.

3. The assessment and control method for time-energy efficiency of CNC machine tools according to claim 2, wherein in step 1, a power sensor is installed at an air switch of a main power supply of the CNC machine tool to collect the power of the main power supply of the CNC machine tool in real time and conduct analog to digital (A/D) conversion; an obtained input power digital signal is transmitted to an information processing terminal and filtered; the operating state of the CNC machine tool is identified online through input power information, and the downtime and extra startup frequency of the CNC machine tool are counted; the CNC machine tool is set to be in a startup state at the beginning of the processing cycle; then the total planned processing time of the CNC machine tool within the processing cycle is denoted as $T_{planed}$; the downtime of the CNC machine tool within the processing cycle is denoted as $T_{downtime}$, the extra startup frequency of the CNC machine tool within the processing cycle is denoted as N;

in step 2, a calculation model of the non-operation time $T_{unavailable}$ of the CNC machine tool is as follows:

$$T_{unavailable} = T_{downtime} + N \times T_{startup}$$

wherein $T_{unavailable}$ represents the non-operation time of the CNC machine tool, $T_{downtime}$ represents the downtime, N represents the extra startup frequency, and $T_{startup}$ represents the single startup time of the CNC machine tool;

for the single startup time $T_{startup}$ of the CNC machine tool, the single startup time $T_{startup}$ of the CNC machine tool is calculated by a mean value method through repeated measurement and recording of the time required for single startup of the CNC machine tool.

4. The assessment and control method for time-energy efficiency of CNC machine tools according to claim 2, wherein in step 3, a calculation model of the startup rate $\eta_{availablity}$ of the CNC machine tool is as follows:

$$\eta_{availablity} = \frac{T_{planed} - T_{unavailable}}{T_{planed}}$$

wherein $\eta_{availablity}$ represents the startup rate of the CNC machine tool; $T_{planed}$ represents the total planned processing time; and $T_{planed}$ represents the non-operation time of the CNC machine tool within the processing cycle;

in step 4, a calculation model of the total planned processing effective energy $E_{planed}$ when the CNC machine tool is not shut down is as follows:

$$E_{planed} = \frac{T_{planed}}{T_{ideal\_CT}} \times E_{ideal}$$

wherein $E_{planed}$ represents the total planned processing effective energy; $T_{planed}$ represents the total planned processing time; $T_{ideal\_CT}$ represents the ideal processing time of a single part; $E_{ideal}$ represents the ideal processing energy of a single part;

for the ideal processing time $T_{ideal\_CT}$ of a single part and the ideal processing energy $E_{ideal}$ of a single part, through the power sensor installed at the air switch of the CNC machine tool, the time and energy required by the CNC machine tool to process a single part under the condition of ideal processing parameters are obtained through multiple measurement; and the ideal processing time $T_{ideal\_CT}$ of a single part and the ideal processing energy $E_{ideal}$ of a single part are obtained by the mean value method.

5. The assessment and control method for time-energy efficiency of CNC machine tools according to claim 2, wherein in step 5, a calculation model of the downtime loss effective energy $E_{downtime}$ when the CNC machine tool has downtime is as follows:

$$E_{downtime} = \frac{T_{unavailable}}{T_{ideal\_CT}} \times E_{ideal}$$

wherein $E_{downtime}$ represents the downtime loss effective energy; $T_{unavailable}$ represents the non-operation time of the CNC machine tool; $T_{ideal\_CT}$ represents the ideal processing time of a single part; and $E_{ideal}$ represents the ideal processing energy of a single part.

6. The assessment and control method for time-energy efficiency of CNC machine tools according to claim 2, wherein in step 6, a calculation model of the target processing effective energy $E_{available}$ of the CNC machine tool within the operation time is as follows:

$$E_{available} = E_{planed} - E_{downtime}$$

wherein $E_{available}$ represents the target processing effective energy within the operation time; $E_{planed}$ represents the total planned processing effective energy; and $E_{downtime}$ represents the downtime loss effective energy.

7. The assessment and control method for time-energy efficiency of CNC machine tools according to claim 2, wherein in step 7, a calculation model of the extra startup energy is as follows:

$$E_{startup\_ex} = N \times E_{startup}$$

wherein $E_{startup\_ex}$ represents the extra startup energy of the CNC machine tool, N represents extra startup frequency, and $E_{startup}$ represents the energy required by single startup of the CNC machine tool;

in step 8, a calculation model of the time-energy efficiency $\eta_{availablity\_e}$ of the CNC machine tool is as follows:

$$\eta_{availablity\_e} = \frac{E_{available}}{E_{available} + E_{downtime} + E_{startup\_ex}}$$

wherein $\eta_{availablity\_e}$ represents the time-energy efficiency of the CNC machine tool; $E_{available}$ represents the target processing effective energy within the operation time; $E_{downtime}$ represents the downtime loss effective energy; and $E_{startup\_ex}$ represents the extra startup energy of the CNC machine tool;

in step 9, an expression of the time-energy efficiency relationship model of the CNC machine tool is as follows:

$$\eta_{availablity\_e} = \frac{\eta_{availablity} \times T_{planed} \times E_{ideal}}{T_{planed} \times E_{ideal} + N \times E_{startup} \times T_{ideal\_CT}}$$

wherein $\eta_{availablity\_e}$ represents the time-energy efficiency of the CNC machine tool; $\eta_{availablity}$ represents the startup rate of the CNC machine tool; $T_{planed}$ represents the total planned processing time of the CNC machine tool; $E_{ideal}$ represents the ideal processing energy of a single part; N represents the extra startup frequency of the CNC machine tool; $E_{startup}$ represents the energy required for single startup of the CNC machine tool; and $T_{ideal-CT}$ represents the ideal processing time of a single part;

in step 10, if the relational expression $$\eta_{availablity\_e} \geq \eta^L_{availablity\_e}$$

is satisfied, this indicates that the time-energy efficiency of the CNC machine tool is normal; if the relational expression $$\eta_{availablity\_e} \geq \eta^L_{availablity\_e}$$

is satisfied, a waring is issued to indicate that the time-energy efficiency of the CNC machine tool is abnormal; and meanwhile, the time-energy efficiency of the CNC machine tool within the cycle, the startup rate, the downtime, the extra startup frequency of the CNC machine tool, and other information are displayed on a display screen.

8. An assessment and control device for time-energy efficiency of CNC machine tools for implementing the assessment and control method for time-energy efficiency of CNC machine tools of claim 1, the assessment and control device for time-energy efficiency of CNC machine tools comprising: a CNC machine tool, a power sensor, a computer and a display screen, wherein the power sensor is used to measure the power of the CNC machine tool and obtain the energy data of the CNC machine tool;

the computer is used to process a power signal and store the collected data information of total planned processing time, downtime, extra startup frequency and energy required for single startup of the CNC machine tool;

the display screen is connected with the computer, and is used to display the information of time-energy efficiency, a startup rate, total planned processing time, downtime, extra startup frequency and energy required for single startup of the CNC machine tool.

9. An assessment and control system for time-energy efficiency of CNC machine tools for implementing the assessment and control method for time-energy efficiency of CNC machine tools of claim 1, the assessment and control system for time-energy efficiency of CNC machine tools comprising:

a non-operation time acquisition module of the CNC machine tool, used for acquiring the output power of a main power supply of the CNC machine tool collected in real time through the power sensor, and processing a rule of a state change of a power curve to obtain the total planned processing time and downtime of the CNC machine tool to obtain the non-operation time of the CNC machine tool within a processing cycle;

a target processing effective energy acquisition module within the operation time, used for calculating the startup rate of the CNC machine tool through the total planned processing time of the CNC machine tool and the non-operation time of the CNC machine tool, and respectively calculating the total planned processing effective energy without downtime and the downtime loss effective energy with downtime through the total planned processing time, the non-operation time of the CNC machine tool and ideal processing time of a single part in combination with the ideal processing time of the single part and an ideal processing energy of the single part, to obtain the target processing effective energy within the operation time;

a relationship model acquisition module, used for calculating the time-energy efficiency of the CNC machine tool through the target processing effective energy within the operation time, the downtime loss effective energy and the extra startup energy, establishing a relationship model of the time-energy efficiency of the CNC machine tool, the startup rate of the CNC machine tool and the extra startup frequency based on the established startup rate of the CNC machine tool and the time-energy efficiency, and monitoring the time-energy efficiency of the CNC machine tool in real time through the relationship model of the time-energy efficiency of the CNC machine tool, the startup rate of the CNC machine tool and the extra startup frequency and conducting overlimit warning.

* * * * *